(12) United States Patent
Imai (10) Patent No.: US 10,861,140 B2
(45) Date of Patent: Dec. 8, 2020

(54) IMAGE PROCESSING APPARATUS, IMAGE PROCESSING METHOD, AND RECORDING MEDIUM

(71) Applicant: CASIO COMPUTER CO., LTD., Tokyo (JP)

(72) Inventor: Shintaro Imai, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 93 days.

(21) Appl. No.: 16/153,290

(22) Filed: Oct. 5, 2018

(65) Prior Publication Data

US 2019/0108625 A1 Apr. 11, 2019

(30) Foreign Application Priority Data

Oct. 5, 2017 (JP) .................................. 2017-195424

(51) Int. Cl.
*G06K 9/00* (2006.01)
*G06T 5/00* (2006.01)
*G06T 19/20* (2011.01)

(52) U.S. Cl.
CPC .......... *G06T 5/008* (2013.01); *G06K 9/00228* (2013.01); *G06K 9/00234* (2013.01);
(Continued)

(58) Field of Classification Search
CPC .. G06T 5/008; G06T 5/40; G06T 5/50; G06T 11/60; G06T 2207/30201; G06T 2207/10024; G06T 2207/30196; G06T 2207/20008; G06K 9/00248; G06K 9/00234; G06K 9/00228; G06K 9/00261; G06K 9/00268; G06K 9/00221; G06K 9/00241; G06K 9/00275; G06K 9/00281;
(Continued)

(56) References Cited

U.S. PATENT DOCUMENTS

| 6,035,074 A * | 3/2000 | Fujimoto ........... G06K 9/00228 |
| | | 382/118 |
| 6,845,181 B2 * | 1/2005 | Dupin ..................... G06T 5/009 |
| | | 382/167 |

(Continued)

FOREIGN PATENT DOCUMENTS

| CN | 105956576 A | 9/2016 |
| JP | 2007193729 A | 8/2007 |
| JP | 2009065269 A | 3/2009 |

OTHER PUBLICATIONS

Office Action (Non-Final Rejection) dated Apr. 16, 2020 issued in related U.S. Appl. No. 16/153,133.
(Continued)

*Primary Examiner* — Jose L Couso
(74) *Attorney, Agent, or Firm* — Holtz, Holtz & Volek PC (57) ABSTRACT

An imaging apparatus 1 includes an image acquisition unit 51 and an image processing unit 53. The image acquisition unit 51 acquires a face image. The image processing unit 53 adjusts the brightness of the face image acquired by the image acquisition unit 51. The image processing unit 53 combines the face image acquired by the image acquisition unit 51 with the adjusted image, using map data (map) in which a predetermined region of the face is set as a transparent region on the basis of a three dimensional shape of the face.

13 Claims, 9 Drawing Sheets

(52) U.S. Cl.
CPC .......... G06K 9/00248 (2013.01); G06T 19/20 (2013.01); *G06T 2207/10024* (2013.01); *G06T 2207/30201* (2013.01); *G06T 2219/2012* (2013.01)

(58) Field of Classification Search
CPC ........... G06K 9/00288; G06K 9/00295; G06K 9/00302; G06K 9/00308; G06K 9/00315; G06K 9/00335; G06K 9/00362; G06K 9/00; G06K 9/36; G06K 9/40; G06K 19/20; G06K 2219/2012; G06K 2009/00322; G06K 2009/00328; H04N 5/23229; H04N 1/62; H04N 1/624; H04N 1/387; H04N 1/4072; H04N 19/17; H04N 19/186

See application file for complete search history.

(56) References Cited

U.S. PATENT DOCUMENTS

| | | | | |
|---|---|---|---|---|
| 7,269,292 | B2* | 9/2007 | Steinberg | G06K 9/00248 348/222.1 |
| 7,634,106 | B2* | 12/2009 | Mino | G06K 9/00228 382/103 |
| 7,940,964 | B2 | 5/2011 | Kobayashi | |
| 2005/0168596 | A1* | 8/2005 | Ito | H04N 1/6088 348/222.1 |
| 2007/0183658 | A1 | 8/2007 | Kobayashi | |
| 2007/0188816 | A1* | 8/2007 | Hayaishi | H04N 1/62 358/3.26 |
| 2008/0317339 | A1 | 12/2008 | Steinberg et al. | |
| 2009/0231467 | A1* | 9/2009 | Yamashita | G03B 7/091 348/234 |
| 2010/0054592 | A1* | 3/2010 | Nanu | G06T 5/008 382/167 |
| 2010/0061631 | A1* | 3/2010 | Omori | G06K 9/00234 382/170 |
| 2010/0111408 | A1* | 5/2010 | Matsuhira | G06T 3/4038 382/164 |
| 2012/0177288 | A1* | 7/2012 | Chaussat | G06K 9/00281 382/165 |
| 2012/0300990 | A1 | 11/2012 | Hanna et al. | |
| 2015/0091900 | A1 | 4/2015 | Yang et al. | |
| 2019/0108628 | A1 | 4/2019 | Sato | |

OTHER PUBLICATIONS

Related U.S. Appl. No. 16/153,133; First Named Inventor: Takeshi Sato; Title: "Image Processing Apparatus, Image Processing Method, and Recording Medium"; filed: Oct. 5, 2018.

Chinese Office Action (and English language translation thereof) dated Apr. 20, 2020 issued in Chinese Application No. 201811165902.5.

Notice of Allowance dated Oct. 5, 2020 issued in related U.S. Appl. No. 16/153,133.

* cited by examiner

FIG. 10

IMAGE PROCESSING APPARATUS, IMAGE PROCESSING METHOD, AND RECORDING MEDIUM

CROSS-REFERENCE TO RELATED APPLICATIONS

This application is based upon and claims the benefit of priority under 35 USC 119 of Japanese Patent Application No. 2017-195424 filed on Oct. 5, 2017 the entire disclosure of which, including the description, claims, drawings, and abstract, is incorporated herein by reference in its entirety.

BACKGROUND OF THE INVENTION

Field of the Invention

The present invention relates to an image processing apparatus, an image processing method, and a recording medium.

Description of the Invention

Conventionally, a process that corrects the face of a person included in an image has been used. For example, JP 2007-193729 A discloses a technique that brightens pixels around the ridge of the nose of the face and darkens pixels around a region from the corners of the eyes to the wings of the nose in order to enhance the three dimensional effect of the face in the printing of the face of a person.

SUMMARY OF THE INVENTION

One aspect of the present invention is an image processing apparatus comprising: a processor, wherein the processor is configured to acquire a face image; adjust brightness of the face image acquired by the acquisition unit; and synthesize the face image acquired by the acquisition unit with the adjusted image, using map data in which a predetermined region of a face is set as a transparent region on the basis of a three dimensional shape of the face.

DETAILED DESCRIPTION OF THE PREFERRED EMBODIMENTS

Hereinafter, an embodiment of the invention will be described with reference to the drawings.

Figure 1:
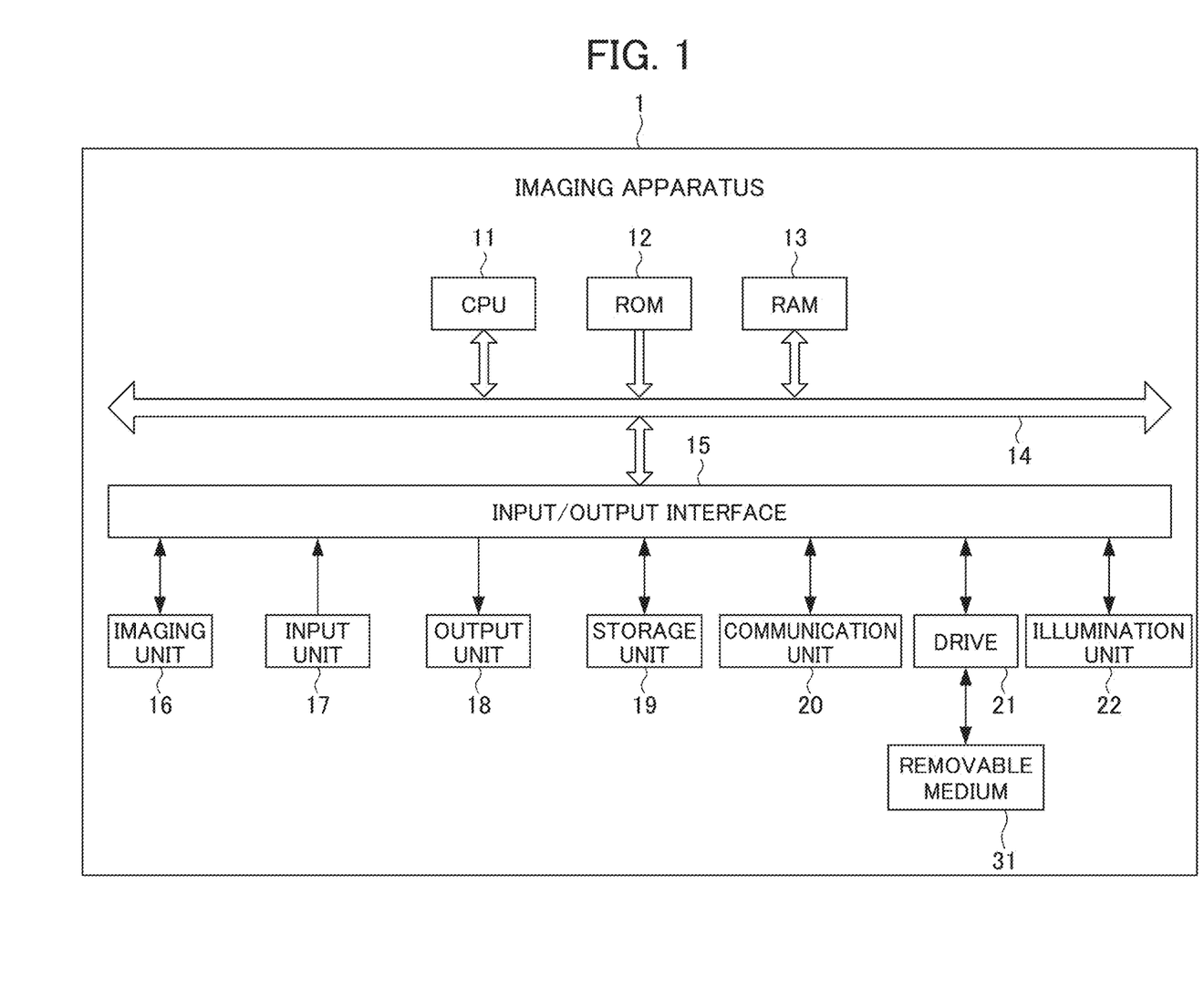
FIG. 1 is a block diagram illustrating the hardware configuration of an imaging apparatus according to an embodiment of an image processing apparatus of the invention.

FIG. 1 is a block diagram illustrating the hardware configuration of an imaging apparatus 1 according to an embodiment of an image processing apparatus of the invention. The imaging apparatus 1 is configured as, for example, a digital camera.

As shown in FIG. 1, the imaging apparatus 1 includes a CPU (Central Processing Unit) 11 serving as a processor, a ROM (Read Only Memory) 12, a RAM (Random Access Memory) 13, a bus 14, an input and output interface 15, an image capture unit 16, an input unit 17, an output unit 18, a storage unit 19, a communication unit 20, a drive 21, and an illumination unit 22.

The CPU 11 executes various processes according to a program recorded in the ROM 12 or a program loaded from the storage unit 19 into the RAM 13.

The RAM 13 also stores data and the like necessary for the CPU 11 to execute various processes as appropriate.

The CPU 11, the ROM 12, and the RAM 13 are mutually connected via the bus 14. The input and output interface 15 is also connected to the bus 14. The input and output interface 15 is also connected to the image capture unit 16, the input unit 17, the output unit 18, the storage unit 19, the communication unit 20, the drive 21, and the illumination unit 22.

Although not shown, the image capture unit 16 includes an optical lens unit and an image sensor.

The optical lens unit is composed of a lens that collects light, for example, a focus lens, a zoom lens, etc., in order to photograph a subject.

The focus lens is a lens that forms a subject image on the light receiving surface of the image sensor.

The zoom lens is a lens that freely changes the focal length within a certain range.

A peripheral circuit for adjusting setting parameters such as focus, exposure, white balance and the like is provided in the optical lens unit as necessary.

The image sensor is composed of a photoelectric conversion element, an AFE (Analog Front End) and the like.

The photoelectric conversion element is composed of, for example, a CMOS (Complementary Metal Oxide Semiconductor) type photoelectric conversion element or the like. A subject image is incident on the photoelectric conversion element from the optical lens unit.

Therefore, the photoelectric conversion element photoelectrically converts (capture) the subject image, accumulates an image signal for a certain period of time, and sequentially supplies the accumulated image signal to the AFE as an analog signal.

The AFE executes various signal processing such as A/D (Analog/Digital) conversion processing and the like on the analog image signal. A digital signal is generated by various kinds of signal processing and output as an output signal of the image capture unit 16.

Such an output signal of the image capture unit 16 is hereinafter referred to as "captured image data".

Data of the captured image is appropriately supplied to the CPU 11, an image processing unit (not shown), and the like.

The input unit 17 is composed of various buttons and the like, and inputs various information according to an instruction operation by a user.

The output unit 18 includes a display, a speaker, and the like, and outputs images and sounds.

The storage unit 19 is made of a DRAM (Dynamic Random Access Memory) and the like, and stores data of various images.

The communication unit 20 controls communication with other apparatuses (not illustrated) through a network including the Internet.

A removable medium 31 formed of a magnetic disk, an optical disk, a magnetooptical disk, a semiconductor memory, or the like, is suitably mounted on a drive 21.

A program read out from the removable medium 31 by the drive 21, is installed in a storage unit 19, as necessary.

In addition, the removable medium 31 is also capable of recording various data items such as data of an image recorded in the storage unit 109, as with the storage unit 109.

The illumination unit 22 includes eight LEDs (light emitting members) that are provided around the imaging unit 16 in a circular shape and one LED that is provided at a position separated from the eight LEDs in the imaging apparatus 1. These LEDs selectively emit light according to an operation of the user in a case in which a live view image is captured or in a case in which an image is recorded. As such, the arrival direction of beams for illumination is changed and the image of the face is captured. Therefore, it is possible to acquire a face image whose shade has been artificially controlled.

The imaging apparatus 1 having the above-mentioned configuration has a function that can appropriately correct the three dimensional effect of the face in a face image, which has been subjected to a whitening process and a skin beautifying process and whose contrast has been reduced by the skin beautifying process, to generate an image (hereinafter, referred to as a "beautiful face image"). That is, in a case in which gamma correction is simply applied to the entire face, partial shading correction or the correction of a low-contrast image is not appropriately performed. However, the imaging apparatus 1 selects an appropriate region and applies local gamma correction (here, gamma correction for a luminance component) to easily generate a three dimensional face image.

In this embodiment, the beautiful face image is generated by performing the whitening process and the skin beautifying process for the entire face, selecting a region including a specific part of the face, and performing local gamma correction.

Figure 2:
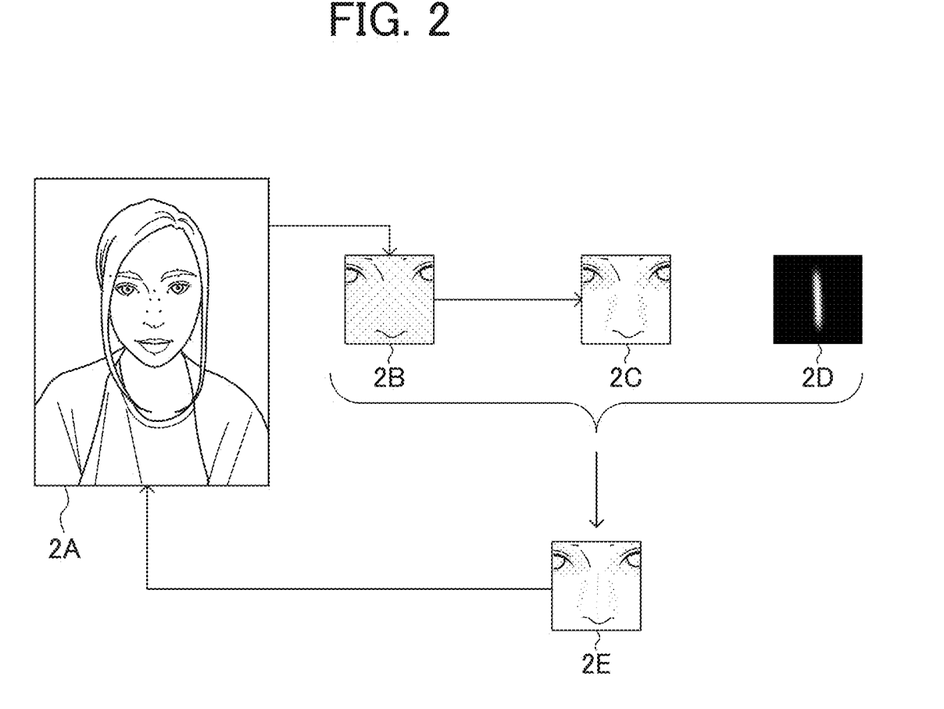
FIG. 2 is a diagram schematically illustrating the generation of a beautiful face image in this embodiment.

FIG. 2 is a diagram schematically illustrating the generation of the beautiful face image in this embodiment. FIG. 2 illustrates an example in which a region including the ridge of the nose as a specific part of the face is selected and local gamma correction is performed. As illustrated in FIG. 2, for the beautiful face image according to this embodiment, a region 2B including a specific part (here, the ridge of the nose) of the face is cropped from an image 2A (hereinafter, referred to as an "original image 2A") which has been entirely subjected to the whitening process and the skin beautifying process. Then, a local gamma correction process is performed for the region 2B to create an image 2C (hereinafter, referred to as a "gamma-corrected image 2C"). In the gamma-corrected image 2C, gamma correction has been performed for the entire cropped image including a part other than the specific part of the face. Therefore, the original image 2A and the gamma-corrected image 2C are synthesized by α-blending, using a map 2D showing the specific part of the face, such that the effect of gamma correction is shown only in the specific part of the face to create an image 2E (hereinafter, referred to as a "specific part gamma-corrected image 2E") in which only the specific part of the face has been subjected to gamma correction. Each pixel value of the map 2D is the α value of each corresponding pixel at the time of image synthesis using α blending. Then, the created specific part gamma-corrected image 2E synthesized with the crop position of the original image 2A to generate a beautiful face image.

Creation of Map

Figure 3A:
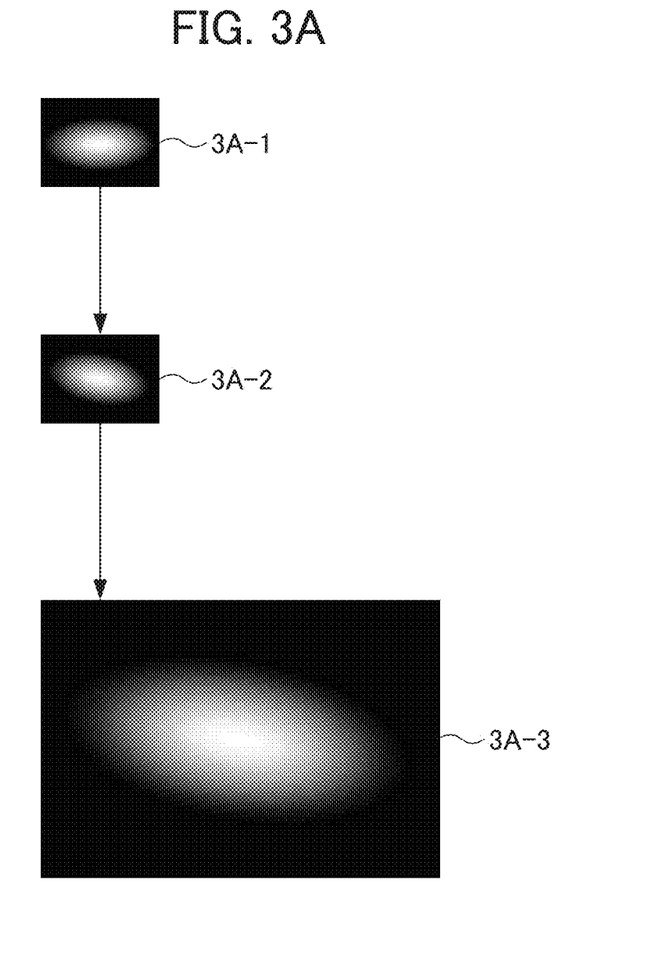
FIG. 3A is a diagram schematically illustrating the creation of a map.
Figure 3B:
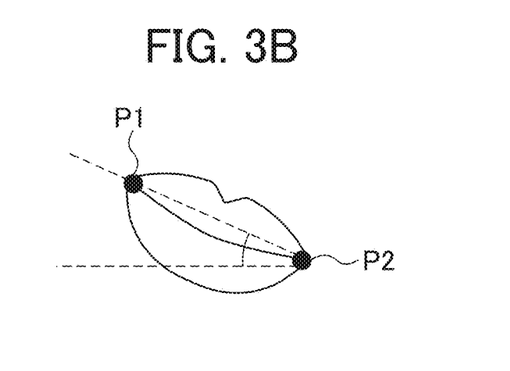
FIG. 3B is a diagram schematically illustrating the creation of the map.

FIGS. 3A and 3B are diagrams schematically illustrating the creation of the map.

The map is a map that simulates the form of a specific part (for example, the ridge of the nose) of a general face and is created in advance in a case in which gamma correction is performed. As illustrated in FIG. 3A, for the map, a map 3A-1 with a reduced size is developed from the stored data. Then, as illustrated in FIG. 3B, the inclination angle of the specific part of the face is calculated from the outline information (both ends P1 and P2 of the outline of the lips) of the specific part of the face in the image and the map is rotated by the angle to generate a map 3A-2. Finally, the map 3A-2 is converted into a map 3A-3 resized to the size of the original image before reduction. The map 3A-3 is used to prevent synthesis with a part other than the specific part of the face in the original image 2A in the α blending process of the gamma-corrected image 2E with the original image 2A.

Application Example of Map

Figure 4:
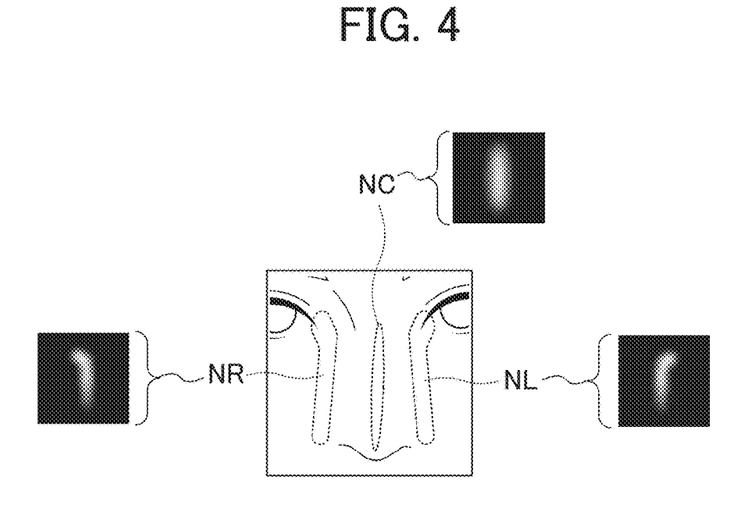
FIG. 4 is a diagram schematically illustrating the relationship between an example of the shape of a map for the ridge of the nose and a map for the side of the nose and a part of the face to which the map is applied.
Figure 5:
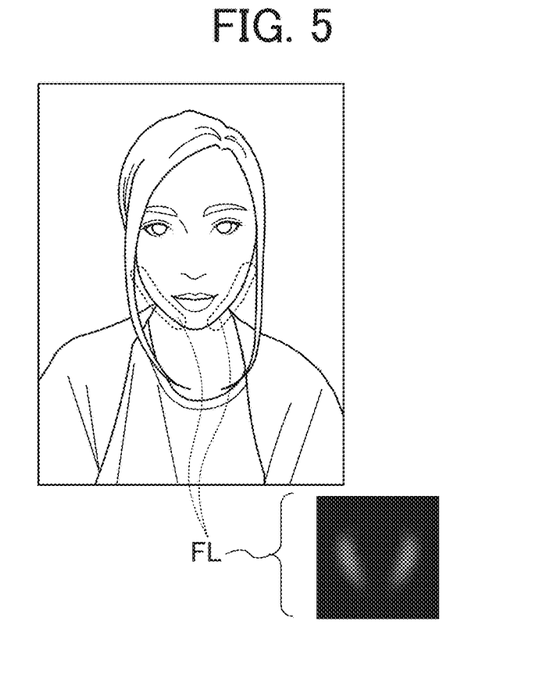
FIG. 5 is a diagram schematically illustrating the relationship between an example of the shape of a map for a face line and a part of the face to which the map is applied.
Figure 6:
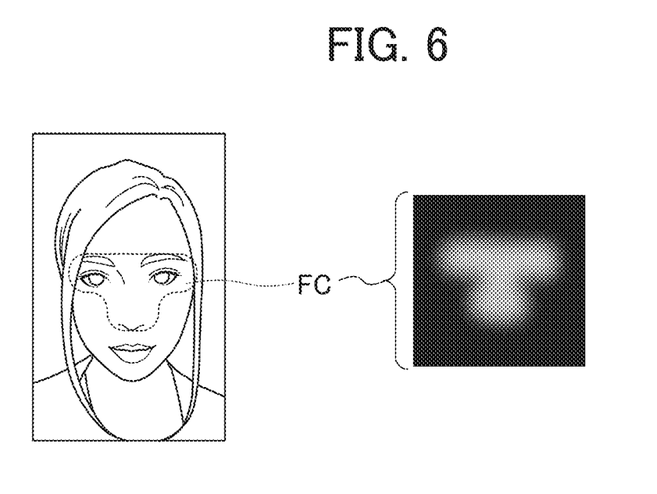
FIG. 6 is a diagram schematically illustrating the relationship between an example of the shape of a map for the periphery of the eyes and the nose and a part of the face to which the map is applied.

As described above, the map is a map that simulates the form of a specific part of a general face. In the generation of the beautiful face image in this embodiment, the maps corresponding to various parts of the face are prepared in order to perform gamma correction for a specific part of the face. FIGS. 4 to 6 are diagrams schematically illustrating the relationship between an example of the shape of the map and the part of the face to which the map is applied. FIG. 4 illustrates a map NC for the ridge of the nose and a maps NR and NL for the side of the nose. FIG. 5 illustrates a map FL for a face line. FIG. 6 illustrates a map FC for the periphery of the eyes and the nose. In FIGS. 4 to 6, the map is illustrated as a dashed closed region.

As illustrated in FIG. 4, the map NC for the ridge of the nose is used to highlight (locally brighten) the ridge of the nose and is applied to the center of the nose. In addition, the maps NR and NL for the side of the nose are used to enhance the shadow of the side of the nose (a region from the corners of the eyes to the wings of the nose) and are applied from the corners of the eye to the side of the nose. The maps NR and NL for the side of the nose are separately prepared for the left and right sides and are symmetric with respect to the center line of the face. The ridge of the nose is highlighted in the map NC for the ridge of the nose and the shadow of the side of the nose are enhanced by the maps NR and NL for the side of the nose to increase the three dimensional effect of the nose.

As illustrated in FIG. 5, the map FL for a face line is used to enhance the shadow of the face line and is applied to the face lines of the left and right cheeks (particularly, a jaw part). In addition, the maps FL for a face line are separately prepared for the left and right sides and are symmetric with respect to the center line of the face. The shadow of the face lines of the left and right cheeks is enhanced by the map FL for a face line to obtain a small face effect. As illustrated in FIG. 6, the map FC for the periphery of the eyes and the nose is used to enhance the shadow of the periphery of the eyes and the nose and is applied to a T-shaped region including both eyes and the nose. The shadow of the periphery of the eyes and the nose is enhanced by the map FC for the periphery of the eyes and the nose to obtain the effect of giving a sharp impression.

Figure 7:
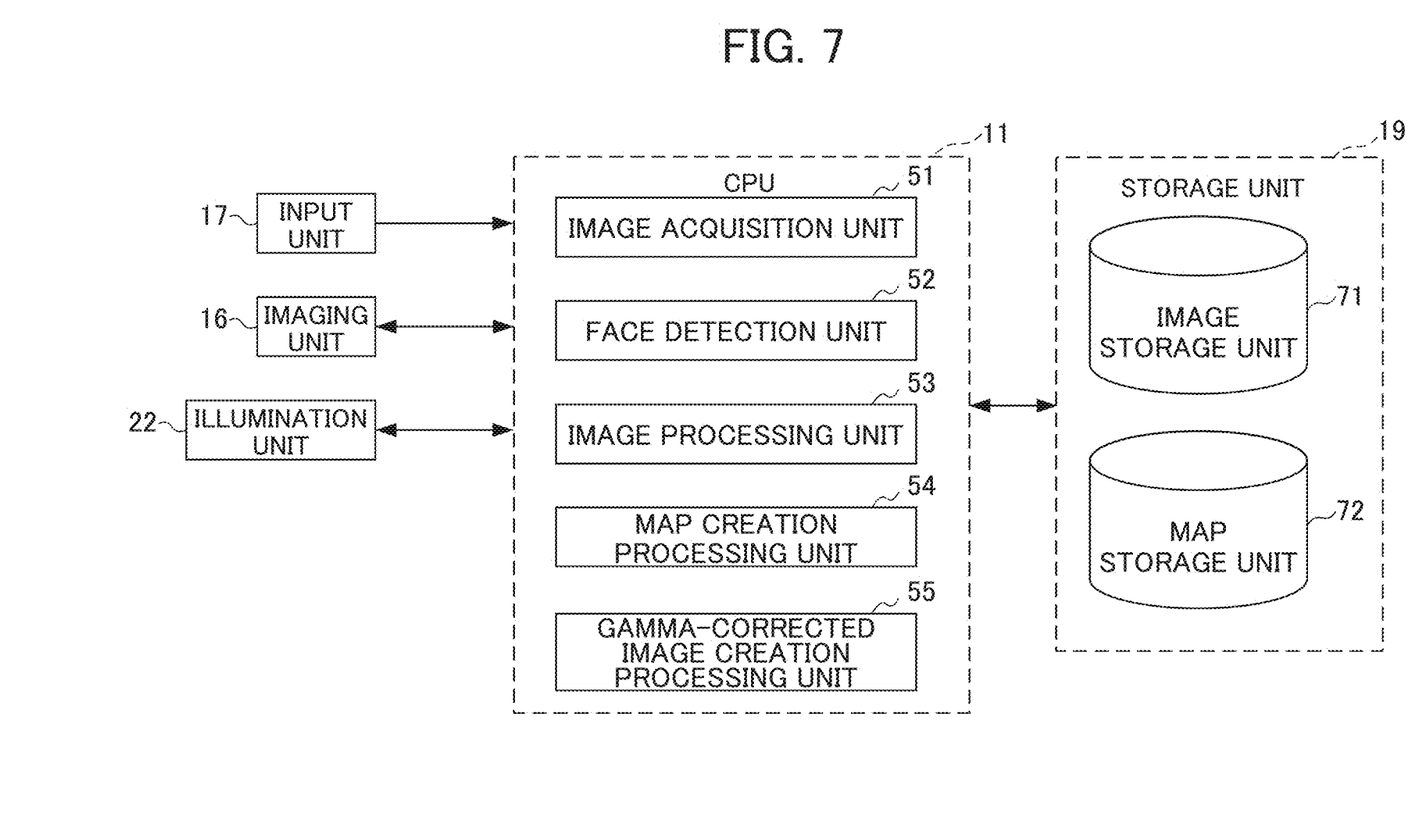
FIG. 7 is a functional block diagram illustrating a functional configuration for performing a beautiful face image generation process among the functional configurations of the imaging apparatus illustrated in FIG. 1.

FIG. 7 is a functional block diagram illustrating a functional configuration for performing a beautiful face image generation process among the functional configurations of the imaging apparatus 1 illustrated in FIG. 1. The beautiful face image generation process means a series of processes which performs the whitening process and the skin beautifying process for the original image including the captured face of a person, generates the specific part gamma-corrected image in which only a specific part of the face has been subjected to gamma correction, and synthesizes the specific part gamma-corrected image with the original image to generate a beautiful face image.

In a case in which the beautiful face image generation process is performed, an image acquisition unit 51, a face detection unit 52, an image processing unit 53, a map creation processing unit 54, and a gamma-corrected image creation processing unit 55 are configured in the CPU 11 as illustrated in FIG. 7.

In addition, an image storage unit 71 and a map storage unit 72 are set in a region of the storage unit 19.

The data of the image output from the imaging unit 16 is stored in the image storage unit 71. The data of a plurality of maps (2D, FIGS. 3A, NC, NR, NL, FL, and FC) with shapes corresponding to various parts of the face is stored in the map storage unit 72. In order to reduce the amount of data, the map with a symmetrical shape may be divided and stored and the divided maps may be developed to form the entire map in a case in which the map is used.

The image acquisition unit 51 acquires the data of the captured image obtained by performing a developing process for the image captured by the imaging unit 16 or the data of the image to be processed from the image storage unit 71.

The face detection unit 52 detects the face from the image and detects each organ forming the face in the detected face. In addition, the face detection unit 52 detects a specific part of the face, to which local gamma correction is to be applied, from the outline information of each part of the face. In a case in which the face and each organ are detected, the existing face detection technique and the existing organ detection technique can be used.

The image processing unit 53 performs various types of image processing for the original image. Specifically, the image processing unit 53 mainly performs a whitening process of correcting three elements, that is, a reduction in saturation, an increase in value, and the rotation of hue in a blue direction. In addition, the image processing unit 53 performs the skin beautifying process of performing correction for smoothing the skin with a bilateral filter (or other smoothing filters). As illustrated in FIG. 2, the image processing unit 53 cuts out a region including the lips from the original image. In addition, the image processing unit 53 combines the cropped image and the created gamma-corrected image on the basis of the created map, using α blending. As a result, a specific part gamma-corrected image is created. Furthermore, the image processing unit 53 attaches the specific part gamma-corrected image to the crop position of the original image. As a result, a beautiful face image is generated.

The map creation processing unit 54 generates a map, using α blending, such that the image in which only a region of a specific part of the face has been subjected to gamma correction is obtained (FIG. 3A).

Figure 8A:
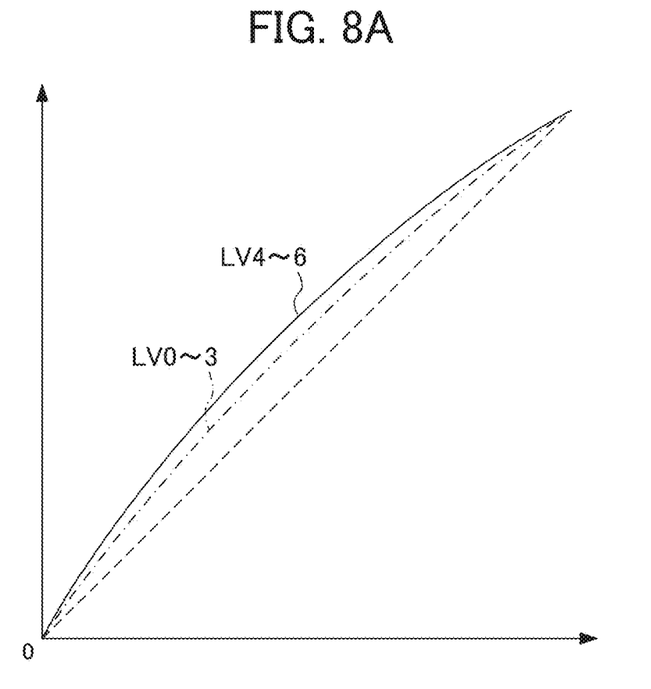
FIG. 8A is a diagram schematically illustrating the relationship between the intensity of a skin beautifying process and gamma correction characteristics and is a diagram schematically illustrating gamma correction characteristics for highlighting.
Figure 8B:
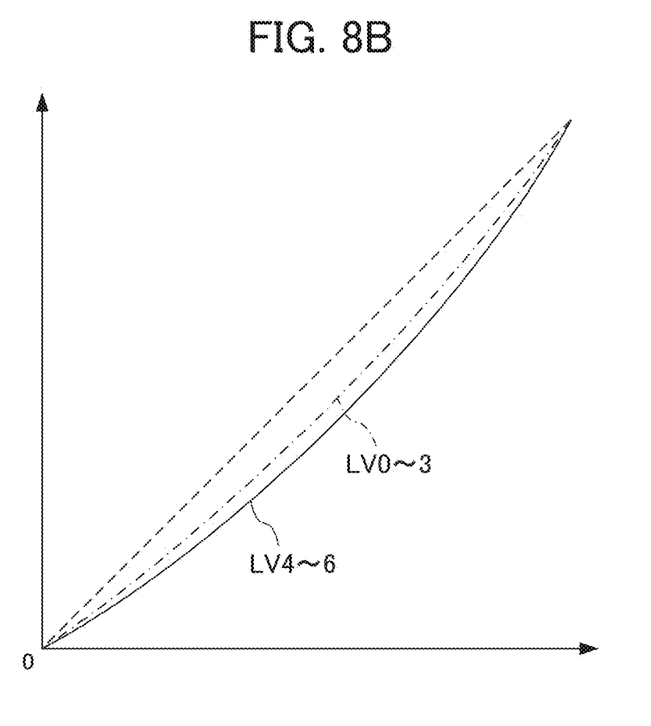
FIG. 8B is a diagram schematically illustrating the relationship between the intensity of the skin beautifying process and gamma correction characteristics and is a diagram schematically illustrating gamma correction characteristics for shadow enhancement.

The gamma-corrected image creation processing unit 55 performs the gamma correction process for the cropped image. Specifically, the gamma-corrected image creation processing unit 55 performs the gamma correction process for the cropped image with the amount of correction of the gamma correction selected according to the intensity of the skin beautifying process. FIGS. 8A and 8B are diagrams schematically illustrating the relationship between the intensity of the skin beautifying process and gamma correction characteristics. FIG. 8A is a diagram schematically illustrating gamma correction characteristics for highlighting and FIG. 8B is a diagram schematically illustrating gamma correction characteristics for shadow enhancement. In FIGS. 8A and 8B, a dashed line indicates gamma correction characteristics in a case in which correction is not performed. In this embodiment, the skin beautifying process can be applied in seven stages of levels 0 to 6. As illustrated in FIGS. 8A and 8B, in a case in which the skin beautifying process is at levels 4 to 6 which are high levels, the gamma correction characteristics are set such that the amount of correction of the gamma correction is more than that in a case in which the skin beautifying process is at levels 0 to 3 which are low levels. In a case in which the strong skin beautifying process is applied, the sharpness of the face image is prevented from being reduced due to a reduction in the contrast of the face image. Therefore, it is possible to generate a three dimensional face image. In addition, the gamma correction characteristics may be individually set so as to correspond to each beautiful skin level.

Figure 9:
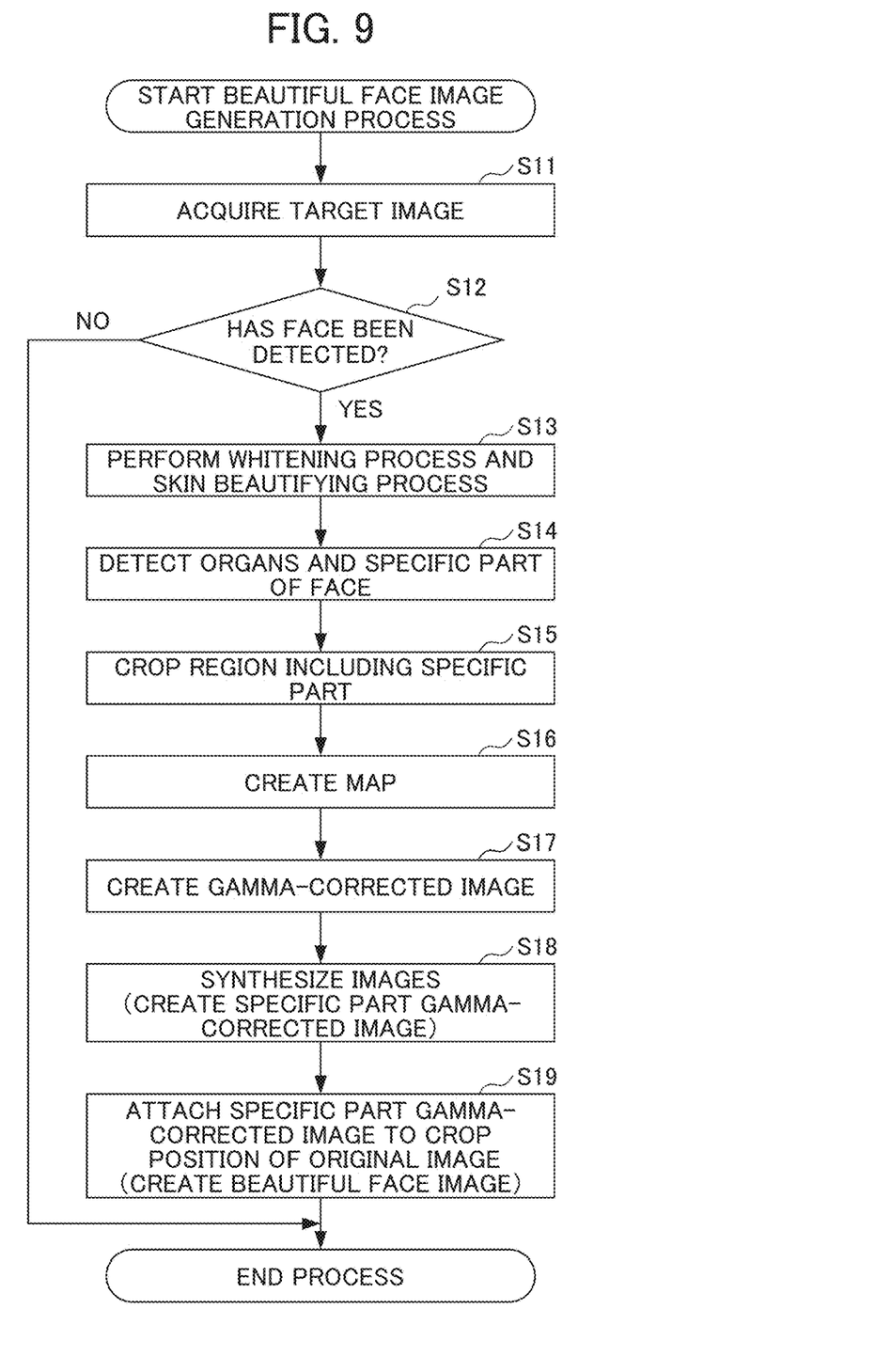
FIG. 9 is a flowchart illustrating the flow of a beautiful face image generation process.

FIG. 9 is a flowchart illustrating the flow of the beautiful face image generation process performed by the imaging apparatus 1 illustrated in FIG. 1 which has the functional configuration illustrated in FIG. 7. The beautiful face image generation process starts in response to the detection of the operation of starting the beautiful face image generation process which has been input to the input unit 17 by the user. The beautiful face image generation process is performed for the image captured in response to the detection of an imaging instruction operation after the developing process is performed for the image. However, the data of the captured image stored in the image storage unit 71 may be selected and the beautiful face image generation process may be performed for the selected data of the captured image.

The image acquisition unit 51 acquires the data of the image that has been captured and developed or the data of the stored captured image from the image storage unit 71 (Step S11).

The face detection unit 52 determines whether a face has been detected from an image corresponding to the acquired data of the captured image (Step S12). In a case in which it is determined that no faces have been detected (Step S12: NO), the beautiful face image generation process ends. In a case in which it is determined that a face has been detected (Step S12: YES), the process proceeds to Step S13.

The image processing unit 53 performs the whitening process and the skin beautifying process for the image to be processed (Step S13). The face detection unit 52 detects each organ forming the face and detects a specific part (for example, the ridge of the nose) of the face, to which local gamma correction is to be applied, from the outline information of each part of the face (Step S14).

The image processing unit 53 cuts out a region including the detected specific part (Step S15). The map creation processing unit 54 creates the map corresponding to the specific part (Step S16).

The gamma-corrected image creation processing unit 55 performs the gamma correction process for the cropped image to create a gamma-corrected image (Step S17).

The image processing unit 53 synthesizes the cropped image and the created gamma-corrected image on the basis of the map, using α blending. As a result, a specific part gamma-corrected image in which only a specific part of the face has been subjected to gamma correction is created (Step S18).

The image processing unit 53 attaches the specific part gamma-corrected image to the crop position of the original image (Step S19). As a result, a beautiful face image that is a three dimensional face image in which the whitening process and the skin beautifying process have been performed for the skin and local gamma correction has been performed for a specific part of the face is generated. Then, the beautiful face image generation process ends.

Modification Example 1

Figure 10:
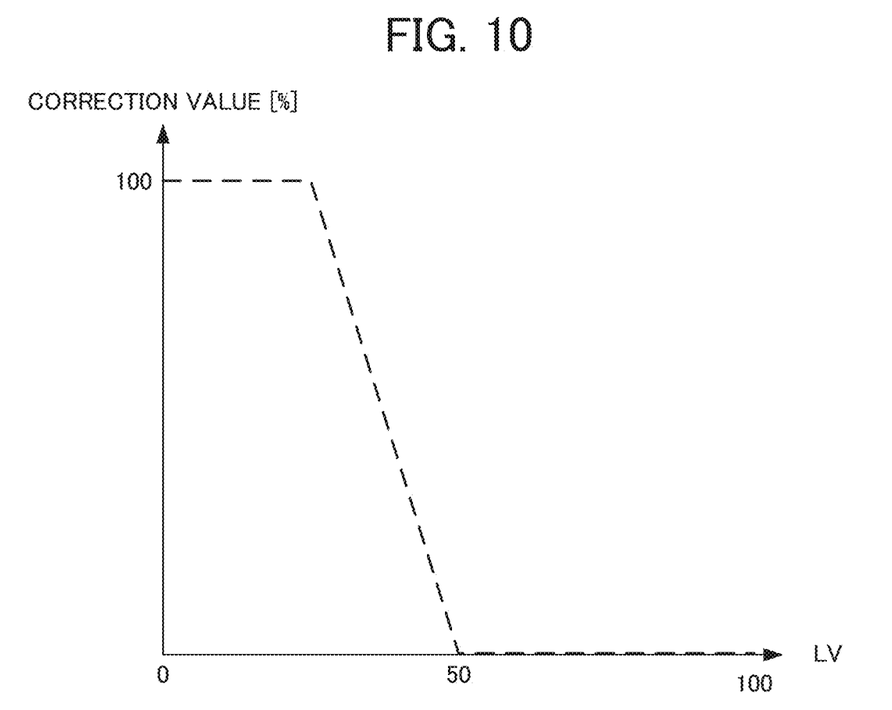
FIG. 10 is a diagram schematically illustrating an example of the correction characteristics for the map.

In the above-described embodiment, in a case in which the α blending of the gamma-corrected image with the cropped image is performed using the map as the α value, the α value of the map may be corrected according to a light value (LV) at the time of imaging. That in the image captured in an environment in which all of the LEDs of the illumination unit 22 are turned on and the LV is large (bright), the contrast of the original image tends to be high as a whole. Therefore, in a region in which the LV is large, the α value of the map is set to be smaller than that in a region in which the LV is small. This configuration makes it possible to prevent shadow from being excessively enhanced. FIG. 10 is a diagram schematically illustrating an example of the correction characteristics for the map. As illustrated in FIG. 10, the map is applied as in the above-described embodiment to generate a specific part gamma-corrected image from the image captured in an environment in which the LV is small (dark). In contrast, in the image captured in the environment in which the LV is large (bright), all of the α values of the maps in the above-described embodiment are zero. This configuration makes it possible to prevent the gamma-corrected image from being synthesized with the cropped image. A region between the region in which the LV is small and the region in which the LV is large can have, for example, the characteristic in which a correction value is linearly reduced.

The imaging apparatus 1 having the above-mentioned configuration includes the image acquisition unit 51 and the image processing unit 53. The image acquisition unit 51 acquires a face image. The image processing unit 53 adjusts the brightness of the face image acquired by the image acquisition unit 51. The image processing unit 53 synthesizes the face image acquired by the image acquisition unit 51 with the adjusted image, using map data (map) in which a predetermined region of the face is set as a transparent region on the basis of the three dimensional shape of the face. Therefore, the imaging apparatus 1 can generate a beautiful face image in which the three dimensional effect of the face has been appropriately corrected. As a result, it is possible to easily generate a three dimensional face image.

In addition, the imaging apparatus 1 includes the map creation processing unit 54. The map creation processing unit 54 performs control such that map data is modified on the basis of the size or shape of a face region in the face image acquired by the image acquisition unit 51. Therefore, in a case in which the image whose brightness has been adjusted is synthesized, it is possible to appropriately prevent the image from being synthesized with a portion other than a target portion.

The three dimensional shape of the face includes the shape of the nose. Therefore, it is possible to appropriately correct the three dimensional effect of the ridge of the nose or the side of the nose.

The image processing unit 53 adjusts the brightness of the face image so as to increase. The image processing unit 53 adjusts a region corresponding to the ridge of the nose in the shape of the nose such that the adjusted image is non-transparent and synthesizes the region. Therefore, it is possible to synthesize a portion whose three dimensional effect has been corrected in the face with the face image.

The image processing unit 53 adjusts the brightness of the face image so as to decrease. The image processing unit 53 adjusts a region corresponding to the corner of the eye or the wings of the nose in the shape of the nose such that the adjusted image is non-transparent and synthesizes the region. Therefore, it is possible to reduce the brightness of the side of the nose and to synthesize the face image that gives a sharp impression.

The three dimensional shape of the face includes the outline shape of the face. The image processing unit 53 adjusts the brightness of the face image so as to decrease. The image processing unit 53 adjusts a region corresponding to the jaw in the outline shape such that the adjusted image is non-transparent and synthesizes the region. Therefore, it is possible to suppress the brightness of a portion corresponding to the law in the outline shape of the face and to give a small face effect to the face image.

Furthermore, the present invention is not limited to the embodiments described above, and modifications, improvements, and the like within a range where the object of the present invention can be attained, are included in the present invention.

For example, in addition to the shape of the maps exemplified in the above-described embodiment and the application parts in the face, various types of maps corresponding to shapes and application parts that can appropriately correct the three dimensional effect of the face may be prepared and used to generate the beautiful face image.

In the above-described embodiment, a digital camera has been described as an example of the imaging apparatus 1 to which the invention is applied. However, the invention is not particularly limited thereto. For example, the invention can be generally applied to electronic apparatuses with an image processing function. Specifically, for example, the invention can be applied to a notebook personal computer, a printer, a television receiver, a video camera, a portable navigation device, a mobile phone, a smart phone, and a portable game machine.

The processing sequence described above can be executed by hardware, and can also be executed by software. In other words, the hardware configuration of FIG. 3 is merely illustrative examples, and the present invention is not particularly limited thereto. More specifically, the types of functional blocks employed to realize the above-described functions are not particularly limited to the examples shown in FIG. 3, so long as the mobile terminal 2 can be provided with the functions enabling the aforementioned processing sequence to be executed in its entirety. A single functional block may be constituted by a single piece of hardware, a single installation of software, or a combination thereof.

The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or storage medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium 113 of FIG. 2 distributed separately from the device main body for supplying the program to a user, but also can be constituted by a storage medium or the like supplied to the user in a state incorporated in the device main body in advance. The removable medium 113 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 2 in which the program is recorded, and a hard disk included in the storage unit 19 of FIG. 2, and the like.

It should be noted that, in the present specification, the steps defining the program recorded in the storage medium include not only the processing executed in a time series following this order, but also processing executed in parallel or individually, which is not necessarily executed in a time series. Further, in this specification, the term of the system shall mean an entire apparatus composed of a plurality of apparatuses, a plurality of means and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An image processing apparatus comprising:
a storage; and
a processor,
wherein the processor is configured to:
   acquire a face image;
   store the acquired face image in the storage;
   read out the acquired face image from the storage, and adjust a brightness of the acquired face image read out from the storage to acquire an adjusted face image; and
   synthesize the acquired face image with the adjusted face image, using map data in which a predetermined region is set as a transparent region based on a three dimensional shape of a face in the acquired face image.

2. The image processing apparatus according to claim 1, wherein the processor is configured to:
   modify the map data based on a size or shape of a face region in the acquired face image, and
   synthesize the acquired face image with the adjusted face image, using the modified map data.

3. The image processing apparatus according to claim 1, wherein the three dimensional shape of the face includes a shape of a nose.

4. The image processing apparatus according to claim 3, wherein:
   the adjustment performed by the processor comprises increasing the brightness of the acquired face image read out from the storage, and
   the processor is configured to synthesize a region corresponding to a ridge of the nose in the shape of the nose such that the adjusted face image is non-transparent.

5. The image processing apparatus according to claim 3, wherein:
   the adjustment performed by the processor comprises decreasing the brightness of the acquired face image read out from the storage, and
   the processor is configured to synthesize a region corresponding to corners of eyes or wings of the nose in the shape of the nose such that the adjusted face image is non-transparent.

6. The image processing apparatus according to claim 1, wherein:
   the three dimensional shape of the face includes an outline shape of the face,
   the adjustment performed by the processor comprises decreasing the brightness of the acquired face image read out from the storage, and
   the processor is configured to synthesize a region corresponding to a jaw in the outline shape such that the adjusted face image is non-transparent.

7. An image processing method which is performed by an image processing apparatus, the image processing apparatus including a storage and a processor, and the image processing method comprising:
   acquiring a face image;
   storing the acquired face image in the storage;
   reading out the acquired face image from the storage, and adjusting a brightness of the acquired face image read out from the storage to acquire an adjusted face image; and
   synthesizing the acquired face image with the adjusted face image, using map data in which a predetermined region is set as a transparent region based on a three dimensional shape of a face in the acquired face image.

8. The image processing method according to claim 7, further comprising:
    modifying the map data based on a size or shape of a face region in the acquired face image,
    wherein the synthesizing comprises synthesizing the acquired face image with the adjusted face image, using the modified map data.

9. The image processing method according to claim 7, wherein the three dimensional shape of the face includes a shape of a nose.

10. The image processing method according to claim 9, wherein:
    the adjusting comprises increasing the brightness of the acquired face image read out from the storage, and
    the synthesizing comprises synthesizing a region corresponding to a ridge of the nose in the shape of the nose such that the adjusted face image is non-transparent.

11. The image processing method according to claim 9, wherein:
    the adjusting comprises decreasing the brightness of the acquired face image read out from the storage, and
    the synthesizing comprises synthesizing a region corresponding to corners of eyes or wings of the nose in the shape of the nose such that the adjusted face image is non-transparent.

12. The image processing method according to claim 7, wherein:
    the three dimensional shape of the face includes an outline shape of the face,
    the adjusting comprises decreasing the brightness of the acquired face image read out from the storage, and
    the synthesizing comprises synthesizing a region corresponding to a jaw in the outline shape such that the adjusted face image is non-transparent.

13. A non-transitory computer-readable storage medium storing an image processing program for an image processing apparatus including a processor and a storage, the image processing program being executable by the processor to control the processor to perform processes comprising:
    acquiring a face image;
    storing the acquired face image in the storage;
    reading out the acquired face image from the storage, and adjusting a brightness of the acquired face image read out from the storage to acquire an adjusted face image; and
    synthesizing the acquired face image with the adjusted face image, using map data in which a predetermined region is set as a transparent region based on a three dimensional shape of a face in the acquired face image.

* * * * *